Patented Aug. 30, 1949

2,480,532

UNITED STATES PATENT OFFICE 2,480,532

STABILIZED 2-SULFANILAMIDO-5-CARBOXYTHIAZOLE

Philip S. Winnek and Earl R. Bockstahler, Indianapolis, Ind., assignors to Allied Laboratories, Inc., Kansas City, Mo., a corporation of Delaware No Drawing. Application September 5, 1945, Serial No. 614,602

10 Claims. (Cl. 167—51.5)

The present invention relates to stabilized 2-sulfanilamido-5-carboxythiazole. More particularly, the present invention relates to a method for stabilizing aqueous solutions of 2-sulfanilamido-5-carboxythiazole salts by including bisulfite ions in such solutions.

The compound, 2-sulfanilamido-5-carboxythiazole has recently been shown to possess an in vitro bacteriostatic activity comparable to that of sulfanilamide, sulfathiazole and sulfadiazine. While 2-sulfanilamido-5-carboxythiazole is stable in solid form, solutions of the salts in water slowly decompose to yield sulfathiazole. The rate of decomposition of the salts of 2-sulfanilamido-5-carboxythiazole in solution varies somewhat with the concentration, the pH and temperature. In general, solutions of the salts will yield precipitates of sulfathiazole in a matter of from two to several weeks.

For many indications, it is desirable that 2-sulfanilamido-5-carboxythiazole be utilized in the form of solutions. For example, in our co-pending application, Serial No. 497,044, issued as U. S. Patent No. 2,389,582 on November 20, 1945, of which the present application is a continuation-in-part, solutions of 2-sulfanilamido-5-carboxythiazole salts of basic vasoconstrictors are described. In the treatment of bovine mastitis, aqueous solutions of salts of 2-sulfanilamido-5-carboxythiazole may produce a desirable bacteriostatic effect when introduced into the infected mammary gland. 2-sulfanilamido-5-carboxythiazole is very poorly absorbed from the intestinal tract and the solutions may advantageously be administered orally for the treatment of enteric infections of animals.

It is an object of the present invention to provide a method for stabilizing aqueous solutions of salts of 2-sulfanilamido-5-carboxythiazole.

It is another object of the present invention to make available solutions of salts of 2-sulfanilamido-5-carboxythiazole containing bisulfite ions as a stabilizing agent, which solutions have advantages over non-stabilized solutions.

It is another object of the present invention to provide solutions of salts of 2-sulfanilamido-5-carboxythiazole having pH values within the range of from about 5.4 to 8 and containing bisulfite ions as a stabilizing agent.

Another object of the present invention is to provide mixtures of salts of 2-sulfanilamido-5-carboxythiazole and a substance capable of furnishing bisulfite ions in acidic solutions which compositions can be dissolved in water to produce stabilized solutions having pH values within the range of from about 5.4 to 8.

In the United States Patent 2,361,624 a method is described for stabilizing alkaline solutions of sulfathiazole, sulfadiazine and similar sulfonamides, against oxidation by including normal sulfite ions. Sulfathiazole and sulfadiazine are only soluble in solutions having relatively high pH values, i. e., 9 to 10. It is impossible to produce an aqueous solution of sulfathiazole or sulfadiazine having a pH value as low as 8. Likewise, there would be very few, if any, sulfite ions present in an aqueous solution having a pH below 8 since they would be changed to bisulfite ions. Since the lack of stability of solutions of 2-sulfanilamido-5-carboxythiazole is due to decarboxylation and not to oxidation, it was entirely unexpected and surprising that aqueous solutions of salts of 2-sulfanilamido-5-carboxythiazole having a pH value of from about 5.4 to about 8 could be stabilized against decarboxylation by including bisulfite ions in the solution.

In carrying out the present invention a salt of 2-sulfanilamido-5-carboxythiazole can be dissolved in water together with a water soluble bisulfite. In many instances it may be desirable to dissolve the salt of 2-sulfanilamido-5-carboxythiazol in water, add the substance capable of providing the bisulfite ions and adjusting the pH to the desired range. The 2-sulfanilamido-5-carboxythiazole salts of organic bases and of alkali metal and alkaline earth metal salts are all soluble within the pH range of from 5.4 to about 8. Our preferred pH range is from about 5.5 to 7.5. It is to be expected, of course, that solutions of the various salts will give solutions of varying pH values. In many cases, it is desirable and we have found that the pH can be adjusted to or near 7 by addition of auxiliary substances. For example, a 2-sulfanilamido-5-carboxythiazole salt of a phenylalkylamine might dissolve in water to give a pH of around 6 in which case sodium hydroxide can be added to raise the pH to about 7. Obviously, the salts may be prepared in solution, that is, 2-sulfanilamido-5-carboxythiazole and the salt forming substance may be reacted in solution to produce the desired concentration and the substance furnishing the bisulfite ions added.

The following representative compositions prepared as indicated above will serve to illustrate the invention:

*Example 1.*—A solution prepared by adding 5% 2-sulfanilamido-5-carboxythiazole, 0.5% sodium sulfite, 0.5% 1-α-hydroxy-β-methylamino-3-hydroxyethylbenzene and sufficient sodium hydroxide to give a pH of 7.0 produced a solution which remained clear and free from precipitate for more than a year. A similar solution from which the sodium bisulfite was omitted gave a precipitate of sulfathiazole in a little over two weeks.

*Example 2.*—A solution prepared by dissolving 10% 2-sulfanilamido-5-carboxythiazole, 2% sodium bisulfite and sufficient sodium hydroxide in water to give a pH of 7 has remained stable for several months. A similar solution prepared without having sulfite ions present precipitated in a much shorter period of time.

Example 3.—10% 2-sulfanilamido-5-carboxythiazole was dissolved in water together with 2% ethylenediamine sulfite and sufficient ethylenediamine to give a pH of 7, and the solution remained stable from January 25 to April 30th. A similar solution omitting the ethylenediamine sulfite gave a precipitate in 31 days.

Example 4.—5% 2-sulfanilamido-5-carboxythiazole, 2% sodium bisulfite and sufficient ethylenediamine to give a pH of 7 in water gave a clear solution that has remained stable for a period of several months.

Example 5.—An aqueous solution made by dissolving 10.0% 2-sulfanilamido-5-carboxythiazole, 5% sodium sulfite and sufficient sodium hydroxide to give a pH of 5.5 has remained stable for 7 months. A similar solution made without the sodium sulfite was stable for only 23 days.

Solutions of salts of 2-sulfanilamido-5-carboxythiazole ranging from 5 to 30% having pH values ranging from 5.4 to about 8 and having from 0.5 to 10% of various bisulfites have been prepared. The stability of these aqueous solutions varied somewhat depending upon the concentration, the pH value and the percentage of bisulfite ions present. In all cases the presence of the bisulfite ions improved the keeping quality of these solutions.

In the above examples, the particular salts employed by way of illustration may be replaced by other 2-sulfanilamido-5-carboxythiazole salts. Included among those salts which are satisfactory are 2-sulfanilamido-5-carboxythiazole salts of phenylalkylamines, 2-sulfanilamido-5-carboxythiazole salts of alkylamines, 2-sulfanilamido-5-carboxythiazole salts of imidazolines or other vasoconstrictor salts disclosed in our copending application referred to above. Specific representative organic bases include ephedrine, $\alpha$-hydroxy-$\beta$-aminopropylbenzene, desoxyephedrine, $\beta$-aminopropylbenzene, 2-aminoheptane, P-hydroxy-$\alpha$-methyl-$\beta$-phenylethylamine and 2(1-naphthylmethyl) imidazoline. In addition, the 2-sulfanilamido-5-carboxythiazole salts of monoethanolamine, diethanolamine as well as higher alkanolamines may be employed.

In place of sodium salts of 2-sulfanilamido-5-carboxythiazole, we may employ the potassium, ammonium, calcium, lithium, or other metallic salts.

To furnish the bisulfite ions in our stabilized solutions, we may employ any of the known sulfites including potassium, calcium, ethanolamine, diethanolamine, n-butylamine, ammonium and the like. Similarly we may employ the bisulfites corresponding to the sulfites just mentioned above.

In one embodiment of our invention, we can prepare a mixture of a salt of 2-sulfanilamido-5-carboxythiazole with a sulfite or bisulfite which mixture will dissolve in water to give a pH within the range from about 5.4 to about 8 and have sufficient bisulfite ions present to stabilize such solutions. A powdered mixture, for example, may contain sodium 2-sulfanilamido-5-carboxythiazole and sodium sulfite or sodium bisulfite in proportions such that one part of the mixture can be dissolved in 100 parts of water to give a solution containing 10% sodium 2-sulfanilamido-5-carboxythiazole and 2% sodium bisulfite. It is contemplated that these solid mixtures may be compressed into pellets or tablets and that such preparations can be dissolved in the drinking water of poultry and/or animals in concentration to give a desirable therapeutic effect.

It will be understood that the present invention can be modified to a considerable extent without departing therefrom and all modifications coming within the scope of the present invention are intended to be covered by the appended claims.

We claim:

1. A stabilized aqueous solution of a salt of 2-sulfanilamido-5-carboxythiazole, said solution having a pH value between 5.4 and 8 and containing bisulfite ions as a stabilizer.

2. A stabilized aqueous solution of an alkali metal salt of 2-sulfanilamido-5-carboxythiazole, said solution having a pH value between 5.5 and 7.5 and containing bisulfite ions as a stabilizer.

3. A stabilized aqueous solution of an amine salt of 2-sulfanilamido-5-carboxythiazole, said solution having a pH value between 5.5 and 7.5 and containing bisulfite ions as a stabilizer.

4. A stabilized aqueous solution of the sodium salt of 2-sulfanilamido-5-carboxythiazole, said solution having a pH value between 5.5 and 7.5 and containing bisulfite ions as a stabilizer.

5. A stabilized aqueous solution comprising from about 5 to about 30% of a salt of 2-sulfanilamido-5-carboxythiazole, said solution having a pH value between 5.5 and 7.5 and containing bisulfite ions as a stabilizer.

6. A stabilized aqueous solution comprising from about 5 to about 30% of a salt of 2-sulfanilamido-5-carboxythiazole, said solution having a pH value between 5.5 and 7.5 and containing from about 0.5 to 10% of a bisulfite as a stabilizer.

7. A stabilized aqueous solution comprising from about 5 to about 30% of the sodium salt of 2-sulfanilamido-5-carboxythiazole, said solutions having a pH value between 5.5 and 7.5 and containing from about 0.5 to 10% of sodium bisulfite as a stabilizer.

8. A stabilized aqueous solution comprising about 5% of the sodium salt of 2-sulfanilamido-5-carboxythiazole, said solution having a pH of about 7 and containing about 2% sodium bisulfite as a stabilizer.

9. A stabilized aqueous solution comprising about 10% of the sodium salt of 2-sulfanilamido-5-carboxythiazole, said solution having a pH of about 7 and containing about 2% sodium bisulfite as a stabilizer.

10. A stabilized aqueous solution comprising about 20% of the sodium salt of 2-sulfanilamido-5-carboxythiazole, said solution having a pH of about 7 and containing about 2% sodium bisulfite as a stabilizer.

PHILIP S. WINNEK.
EARL R. BOCKSTAHLER.

REFERENCES CITED

The following references are of record in the file of this patent:

UNITED STATES PATENTS

| Number | Name | Date |
| --- | --- | --- |
| 1,873,668 | Schmidt | Aug. 23, 1932 |
| 2,361,624 | Hamilton et al. | Oct. 31, 1944 |
| 2,408,818 | Sabotka | Oct. 8, 1946 |

OTHER REFERENCES

Proc. Soc. Exptl. Biol. and Med., Feb., 1945, pages 116 to 119.

Recueil des Trav. Chim. des Pays Bas, 61, (1942) pages 463 to 466.